US012665150B2

(12) United States Patent
Grenier-Poulin et al.

(10) Patent No.: US 12,665,150 B2
(45) Date of Patent: Jun. 23, 2026

(54) ELECTRIC POWER INTERRUPTER AND METHOD THEREOF

(71) Applicant: TECHNOLOGIES MINDCORE INC., Terrebonne (CA)

(72) Inventors: Renaud Grenier-Poulin, Terrebonne (CA); Neil McCord, Terrebonne (CA); Julien Rioux, Terrebonne (CA); Louis-Philippe Gauvreau, Terrebonne (CA); Ali Yalpanian, Montreal (CA); Jocelyn Ouellet, Terrebonne (CA); Patrick Lalonge, Terrebonne (CA); Philippe Corriveau, Terrebonne (CA)

(73) Assignee: TECHNOLOGIES MINDCORE INC., Terrebonne (CA)

( * ) Notice: Subject to any disclaimer, the term of this patent is extended or adjusted under 35 U.S.C. 154(b) by 173 days.

(21) Appl. No.: 18/306,200

(22) Filed: Apr. 24, 2023

(65) Prior Publication Data

US 2023/0343529 A1 Oct. 26, 2023

Related U.S. Application Data

(60) Provisional application No. 63/363,477, filed on Apr. 22, 2022.

(51) Int. Cl.
*H01H 33/666* (2006.01)
*H01H 33/664* (2006.01)

(52) U.S. Cl.
CPC ...... *H01H 33/6664* (2013.01); *H01H 33/664* (2013.01); *H01H 2033/6667* (2013.01)

(58) Field of Classification Search
CPC ............. H01H 33/6664; H01H 33/664; H01H 33/666; H01H 2033/6667; H01H 3/46; H01H 2033/66253
USPC ....... 218/118, 120, 123, 134, 136, 138, 139, 218/140, 146, 147
See application file for complete search history.

(56) References Cited

U.S. PATENT DOCUMENTS

| | | | | | |
|---|---|---|---|---|---|
| 3,784,774 | A * | 1/1974 | Wilson | H01H 33/666 | 218/140 |
| 4,168,414 | A * | 9/1979 | Kumbera | H01H 33/666 | 200/318 |
| 4,492,835 | A | 1/1985 | Turner | | |
| 6,130,394 | A * | 10/2000 | Hogl | H01H 33/66207 | 218/138 |
| 6,316,742 | B1 | 11/2001 | Rostron et al. | | |
| 7,829,814 | B2 * | 11/2010 | Marchand | H01H 33/6661 | 218/140 |

(Continued)

*Primary Examiner* — William A Bolton
(74) *Attorney, Agent, or Firm* — Brouillette Legal inc.; Philippe Brouillette

(57) ABSTRACT

A novel electric power interrupter is provided, the interrupter comprising concentric springs and interlocking hooks for opening and closing the interrupter. The electric power interrupter further comprises a housing over a vacuum chamber and an electrically insulating layer around the vacuum chamber, a fixed section and a moving section. The butt contact of the fixed section is stationary, while the butt contact of the movable section moves towards and away from the fixed section. A toggle mechanism is provided for operating the movable section to open or close the interrupter. The present invention provides a better voltage dissipation and reduces the risk of electrical arcs forming outside the interrupter.

20 Claims, 15 Drawing Sheets

(56) References Cited

U.S. PATENT DOCUMENTS

| | | | | |
|---|---|---|---|---|
| 8,242,399 | B2 * | 8/2012 | van Dijk | H01H 33/42<br>200/251 |
| 9,659,729 | B2 * | 5/2017 | Bartz | H01H 33/66207 |
| 9,912,141 | B2 * | 3/2018 | Gentsch | H01H 33/66 |
| 10,600,592 | B2 * | 3/2020 | Rhein | H01H 33/666 |
| 10,784,064 | B2 * | 9/2020 | Kowalyshen | H01H 33/6662 |
| 10,825,625 | B1 * | 11/2020 | Marshall | H01H 33/6662 |
| 2005/0082260 | A1 | 4/2005 | Martin | |
| 2005/0241928 | A1 | 11/2005 | McCord et al. | |

* cited by examiner

ELECTRIC POWER INTERRUPTER AND METHOD THEREOF

CROSS-REFERENCE TO RELATED APPLICATIONS

The present patent application claims the benefits of priority of U.S. Provisional Patent Application No. 63/363,477, entitled "ELECTRIC POWER INTERRUPTER AND METHOD THEREOF", and filed at the United States Patent and Trademark Office on Apr. 22, 2022, the content of which is incorporated herein by reference.

FIELD OF THE INVENTION

The present invention generally relates to electric power interrupters, more specifically to mechanisms for opening and closing vacuum interrupters and to increase the dissipation of voltage.

BACKGROUND OF THE INVENTION

Electric power interrupters typically comprise a switching mechanism located outside the interrupter for opening or closing a contact in a vacuum chamber for ark quenching. Butt contacts used in vacuum chambers generally require a good amount of force to overcome inertia of the system when opening or closing it. The electric power interrupters generally comprise a spring located inside the interrupter and an assortment of springs located outside the same. The switching mechanism typically activates the compression or tension of the springs. Understandably, as a plurality of components are needed to open and/or close the interrupter, the probability of having mechanical failure is non negligible. In the prior art devices, several components responsible for the switching are outside and/or away from the contact point of the vacuum chamber. Flexion, bowing and buckling of the springs or of other any of the components may thus occur.

Furthermore, electric power interrupters often require an insulation layer around the vacuum chamber. The insulation layer generally increases the dissipation of voltage and heat away from the interrupter. A problem of such configuration is that because the length of the vacuum chamber is usually of a couple inches only, the metal-to-metal distance between both ends of the insulation is prone to electrical arks which may form outside of the interrupter.

There is thus a need for an electric power interrupter having a more compact toggling mechanism between the open and close states and having a better voltage dissipation.

SUMMARY OF THE INVENTION

The shortcomings of the prior art are generally mitigated by providing an electrical power interrupter and a method for interrupting electrical power as described hereinabove.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE INVENTION

Figure 1:
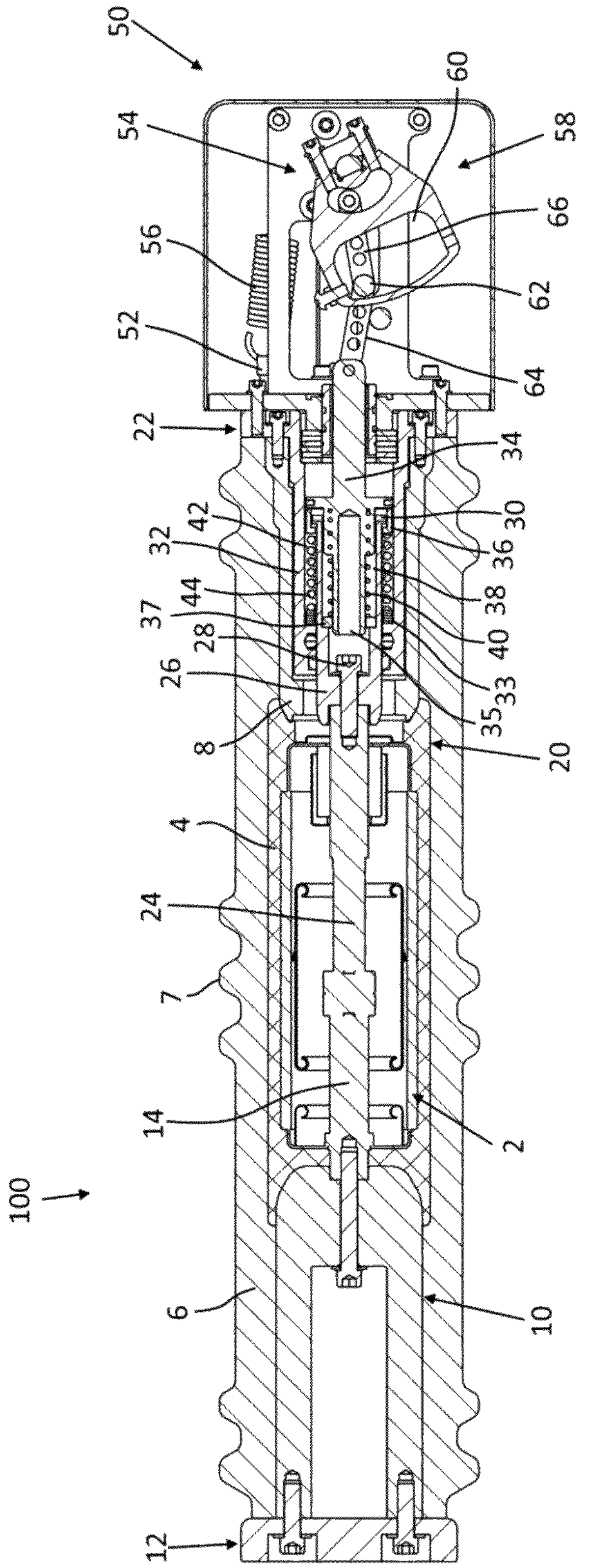
FIG. 1 is a side cross-sectional view of an electric power interrupter in a closed state in accordance with the principles of the present invention.

A novel load interrupter and method of interrupting a load will be described hereinafter. Although the invention is described in terms of specific illustrative embodiments, it is to be understood that the embodiments described herein are by way of example only and that the scope of the invention is not intended to be limited thereby. Directional terms such as "right", "left", "up" and "down" used in the current description are made with reference to the directions in the drawing figures and other embodiments may comprise other directions as long as each of the directions have the same relation to one another as described herein.

Figure 3:
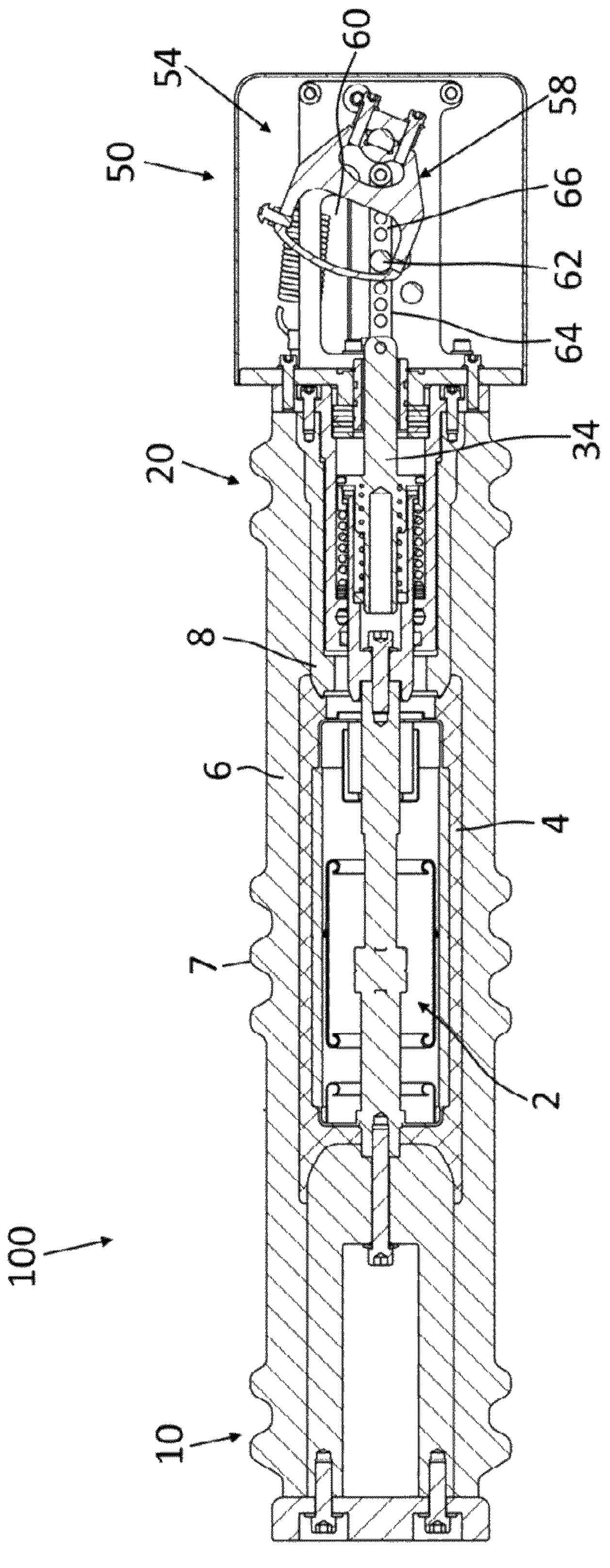
FIG. 3 is a side cross-sectional view of an electric power interrupter in a ready to trip state in accordance with the principles of the present invention.
Figure 5:
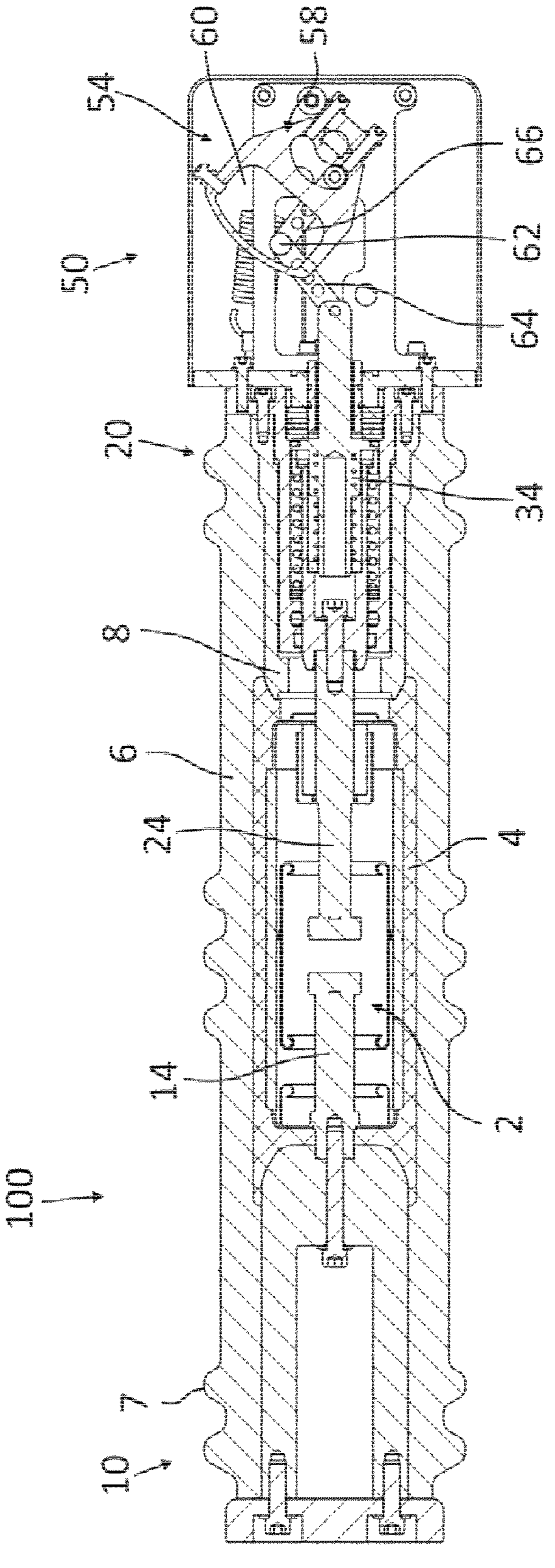
FIG. 5 is a side cross-sectional view of an electric power interrupter in an opened state in accordance with the principles of the present invention.

Referring now to FIGS. 1, 3 and 5, a side cross-sectional view of an embodiment of an electric power interrupter 100 is illustrated. The electric power interrupter 100 comprises an interrupting chamber 2 housed within an insulator or insulating layers 4 and 6. Within the interrupting chamber 2, a fixed portion 10, or fixed section, and a moveable portion 20, or moveable section, are in contact when the interrupter 100 is in a closed state and are separated or moved away one from the other when the interrupter is in an opened state. The illustrated interrupter 100 is a vacuum interrupter, however any other type of interrupter known in the art could be used.

In such an embodiment, the electrical current is moving from a first location or input port 22 on the moveable portion 20 to a second location or output port 12 on the fixed portion 10. As an example, the input port 22 is at 160 kV and the output port is the ground, so at 0V. Understandably, when the interrupter 100 is in an opened state, as the electrical connection is broken, any electrical current is quenched in the vacuum interrupting chamber 2. Understandably, any other medium such as sulfur hexafluoride gas, SF6, known in the art may be used to quench the electrical current. Each of the fixed section 10 and moveable section 20 comprises a connecting means 14, 24, respectively. The connecting means 14 or 24, also referred to as an elongated contacting member, is typically embodied as a conducting shaft or rod. In the illustrated embodiment, the connecting means 14, 24 comprises a butt contact adapted to establish an electrical connection in the interrupting chamber 2. In the present embodiment, the butt contact 14 of the fixed section 10 is stationary, without regard to the open or close state of the interrupter 100. The butt contact 24 of the moving section 20 is generally moving towards the butt contact of the fixed section 10 when the interrupter 100 is closing and is moving away from the butt contact of the fixed section 10 when the interrupter 100 is opening. The butt contacts of the fixed 10 and moving sections 20 are in contact when the interrupter 100 is in a closed state to establish an electrical connection.

The interrupter 100 further comprises a toggle mechanism 50. The toggle mechanism 50 is generally adapted to operate the moveable portion 20. The toggle mechanism 50 may be operated to open or close the interrupter 100. In some embodiments, the toggle mechanism 50 may be partly located within the insulator or insulation layer 6 and may be partly located outside of the insulator 6.

In the illustrated embodiment, the toggle mechanism 50 is operated by rotating the D shaft 52. The D shaft 52 triggers the latching mechanism 54. The D shaft 52 is preferably outside of a cove 61 of the toggle mechanism 50. The latching mechanism 54 typically comprises a spring 56, a lever 58 and trusses 64, 66. The spring 56 is mechanically connected to the lever 58 so that the spring 56, when compressed, rotates the lever 58 about a pivot point 62. As embodied, the lever 58 comprises two apertures 60 adapted to receive the pivot point/fulcrum 62 of two trusses 64, 66. It may be understood as the lever 58 is rotated, the pivot point 62 is translated as a linear or curved translation, typically up and down. The trusses 64, 66 are pivotally attached to one another. The movement of the pivot point 62 induces pivoting of the trusses 64, 66. The truss 64, generally placed on the left of the toggle mechanism 50 as illustrated is preferably pivotally attached to the moving section 20. The truss 66 is generally placed on the right of the toggle mechanism 50 as illustrated. The truss 66 is pivotally and moveably connected to the lever 58. In the illustrated embodiment, the truss 66 comprises a pin or member inserted in an aperture 60 of the lever 58. Movement of the aperture 60 induces movement of one end of the truss 66.

When operated, the toggling mechanism 50 may displace the moveable portion 20 sideways depending on the position of the rotatable lever 58. It may be understood that any other toggle mechanism for translating the moving section of a power interrupter known in the art may be used. For example, the latching mechanism 54 may comprise more or less than two trusses.

The moveable portion 20 comprises a contact member 24, typically embodied as a shaft. The contact member 24 typically comprises a first end adapted to contact the first end of the shaft 14 of the fixed section 10. In the illustrated embodiment, as described above, the ends of the contact members 14, 24 are embodied as butt ends. Understandably, any other type of ends could be used within the scope of the present invention.

The contact member 24 comprises a second end secured to a first end of the inner tubular section 26. In the present embodiment, a fastener 28, such as bolt and nut, secures the inner tubular section 26 to the contact shaft 24. Understandably, any other fastening mechanism known in the art may be used. The inner tubular section 26 comprises a second end embodied as an abutting member or an outwardly extending hook 30. A cross section of the outwardly extending hook 30 may partly or fully cover the cross-section of the inner tubular section 26. The interrupter 100 further comprises an outer tubular section 32. The outer tubular section 32 is generally fixed with regards to the interrupter 100 when installed.

The interrupter 100 further comprises a plunger 34 comprising a first end and a second end. The first end of the plunger 34 is partly housed within the inner tubular section 26 and the second end of the plunger 34 is secured to the toggle mechanism 50. In the illustrated embodiment, the second end of the plunder is pivotally attached to the truss 64. As such, the truss 64 may freely rotate when the toggling mechanism 50 is activated. The plunger 34 comprises a cross-section along its length having larger circumference than the average circumference of the remainder of the body of the plunger 34. As illustrated, the cross-section of the inwardly extending hook 36 is smaller than the cross-section of the other end of the plunger 34.

A first concentric gap 38 is formed between an outer surface of the plunger 34 and an inner surface of the inner tubular section 26. The interrupter further comprises a first spring 40 around the body of the plunger 34. The first spring 40 fits within the first concentric gap 38. The first spring 40 is held in compression between the inner tubular section 26 and the plunger 34. The inner tubular section 26 serves as a recess portion for the plunger 34.

A second concentric gap 42 is formed between the outer surface of the inner tubular section 26 and the inner surface of the outer tubular section 32 The interrupter further comprises a second spring 44. The second spring 44 is inserted around the inner tubular section 26. The second spring 44 is held in compression between the outer tubular section 32 and the plunger 34. In the illustrated embodiment, the second spring 44 has a spring constant being equal or higher than the first spring 40. It may be appreciated that by having the first and second springs 40, 44 within the electric power interrupter 100 and substantially close to the contact of the fixed and moving members 14, 24, the risk of flexion, bowing or buckling associated with having at least one of springs outside or away from the interrupter 100 is substantially reduced. Having the two springs 40, 44 inside the electric power interrupter 100 generally aims at providing a compact design of the interrupter 100.

The interrupter 100 further comprises a tubular shield 8. The outer tubular section 32 is preferably housed within the tubular shield 8. An outer surface of the shield 8 is in contact with the insulator 6 and with the housing 4 of the vacuum chamber 2. The inner surface of the shield 8 is in contact with the outer surface of the outer tubular section 32. The housing 4 of the vacuum chamber 2, also referred to as vacuum interrupter, is preferably made of a urethane or silicone material. It may be appreciated that other materials for housing/insulating a vacuum interrupter may be used. The shield 8 may hermetically close the surface of the vacuum chamber 2 by pressing against the material of the housing 4 when installed. The elastic nature of the housing 2 and/or the shield 8 material of the vacuum interrupter generally aims at both parts to be pressed against one another to obtain a hermetic sealing. The sealing between the housing 4 and the shield 8 of the vacuum interrupter generally allows the material of the insulator 6 to be poured over both without spilling inside the vacuum interrupter 2. Once the shield 8 is installed and bolted, the position of the shield 8 is fixed with regards to the electric power interrupter 100. Both of the shield 8 and the vacuum interrupter 2 are preferably casted into an insulating material being the insulator 6. In a preferred embodiment, the material used for the insulator 6 is epoxy or a polymer. Understandably, any other known electrically insulating material known in the art of power interrupters may be used.

The insulator 6 generally extends over the entire length of the electric power interrupter 100. Only the two opposite ends or poles 12, 22 generally protrude from the insulator 6. The toggle mechanism 50 may also protrude from the insulation layer 6. The insulator 6 generally covers the entire circumference of the electric power interrupter 100 and is made to control the voltage withstand properties in air in an optimal manner. Accordingly, the embodied insulator 6 may comprise fins 7. The fins generally aim at providing dielectric strength by increasing creepage distance. The urethane or silicone 4 covering the vacuum interrupter 2 increases the heat transfer and is required to withstand high voltage values. The epoxy 6 covering the urethane or silicone 4 generally has an increased surface in contact with air. Such surface allows heat and voltage to quickly dissipate. Accordingly, by having a combination of a urethane or silicone housing 4 over the vacuum interrupter 2, an epoxy insulator 6, heat and voltage may be efficiently dissipated in ambient air. Since the high voltage terminals 12, 22 are located at the two ends of the insulator 6, the possibility of an electrical ark extending from one high voltage terminal 12 to another 22, also referred as an ark, is substantially decreased. Given the distance between the two high voltage terminals 12, 22, the electric power interrupter 100 is more likely to withstand dielectric tests. For example, the length of a vacuum interrupter may be of 10 inches wherein the length of the insulator, and therefore between the two high voltage terminals, may be of 25 inches.

Referring to FIG. 1, the electric power interrupter 100 is in the closed state. The electrical current is interrupted between the left end 12 of the interrupter 100 and the right end 22 of the same. Referring to FIG. 3, the electric power interrupter 100 is still in the closed state, however it is ready to trip. Referring to FIG. 5, the electric power interrupter 100 is in the open state. In the open state, no electrical current travels between the contacts 22 and 12.

Figure 2:
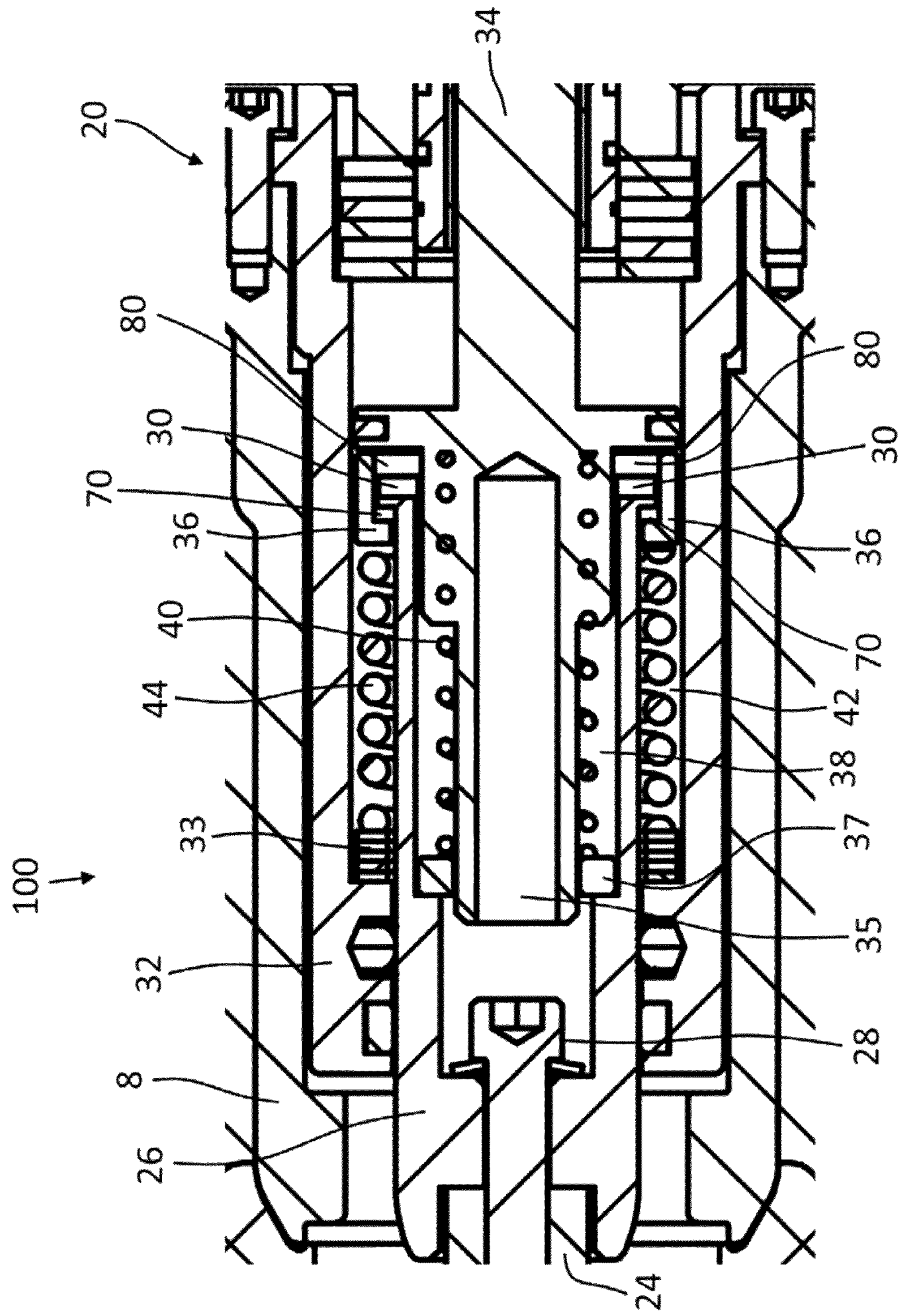
FIG. 2 is a detailed view of a moveable portion of the electric power interrupter of FIG. 1.

Referring now to FIGS. 1 and 2, the electric power interrupter 100 is illustrated in a closed state with a detailed view of the moving section 20. In the closed state shown in FIG. 1, the trusses 64, 66 of the toggle mechanism 50 are slightly pivoted following the shared pivot point 62 being slightly off centered towards the bottom. Understandably, in other embodiments, the position of the pivot point 62 over the central horizontal axis may close rather than open the electric power interrupter 100 and vice-versa. The connecting member 24 of the moveable portion 20 is in contact through the butt end with the butt end of the fixed section 10.

Referring now to FIG. 2, the plunger 34 is pushed to the left within the inner tubular section 26. It may be appreciated that the plunger 34 comprises an annular hole 35. The annular hole 35 is typically located at a first end of the plunger 34. The annular hole 35 configured to receive a fastener 28 of the inner tubular section 26 if the plunger 34 is displaced to a point of contact with the fastener 28. In a closed state, the inwardly extending hook 36 of the plunger 34 is pushing against the second spring 44 towards the left side. The second spring 44 is thus compressed between the inwardly extending hook 36 and the outer tubular section 32. Washers or other shim member 33 may be installed between the outer tubular section 32 and the second spring 44 to obtain a desired closing force in the vacuum interrupter 2 since the dimensions and spring constant may vary for each individual spring. The plunger 34 being pushed to the left, the inwardly extending hook 36 is also pushed towards the left. Accordingly, in the closed state, the outwardly extending hook 30 of the inner tubular section 26 is not in contact with the inwardly extending hook 36 and none of the two is pushing against the other towards the left or right side. The plunger 34 being pushed to the left by the toggling mechanism 50, the first spring 40 is compressed between the inner tubular section 26 and the plunger 34. Thus, the first spring 40 applies a force on the plunger 34 towards the right while simultaneously applying a force against the inner tubular section 26 which displaces the moving shaft 24 in the vacuum interrupter 2 towards the fixed shaft 14 of the same.

A circular piece 37 may surround the left end of the plunger 34 and may abut against the inner tubular section 26 and the first spring 40. The circular piece 37 may prevent the first spring 40 from sliding within a possible gap between the inner tubular section 26 and the plunger 34.

The gaps present on the left 70 and right 80 sides of the outwardly extending hook 30 are adapted to allow length adjustments when opening or closing the electric power interrupter 100. As may be understood, the actual measurements and properties of springs is generally not the same than the theoretical manufacturing specification, especially with variations due to tolerancing. Furthermore, the assembly of the parts of the electric power interrupter 100 may not provide the same results between two of the same electric power interrupters. Accordingly, the gaps (70, 80) are configured to negate these variations by providing free space between abutting parts (30, 36).

Figure 4:
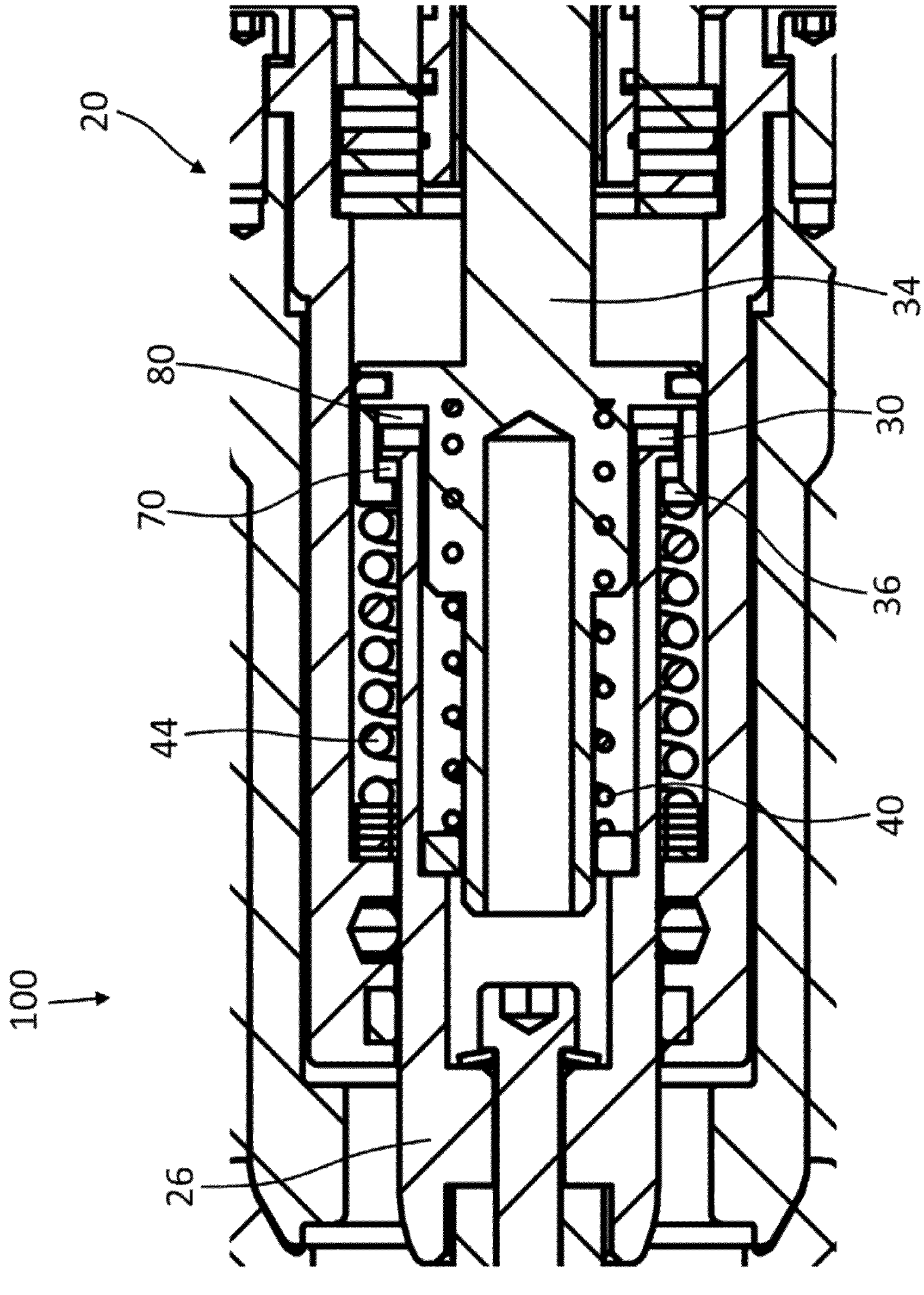
FIG. 4 is a detailed view of a moveable portion of the electric power interrupter of FIG. 3.

Referring now to FIGS. 3 and 4, the electric power interrupter 100 is shown in a closed state, yet ready to trip, with a detailed view of the moving section 20. In the ready to trip state shown in FIG. 3, the trusses (64, 66) of the toggle mechanism 50 are straight following the shared pivot point 64 being centered with the central horizontal axis of the electric power interrupter 100. The shaft 24 of the moving section 20 is in contact through the butt end with the butt end of the fixed section 10. Referring now to FIG. 4, the trusses (64, 66) of the toggle mechanism 50 being straight, the plunger 34 is further pushed towards the left side of the electric power interrupter 100. It may be appreciated that, compared to the plunger 34 in FIG. 2, the plunger 34 in the ready to trip state is pushed more to the left toward the inner tubular section 26. However, since the butt ends of the moving 20 and fixed 10 sections are already touching one another, the force in the first spring 40 is increased. The gap 70 between the outwardly extending hook 30 and the inwardly extending hook 36 is further increased due to the displacement of the plunger 34. Accordingly, the compression force in the second spring 44 is also increased.

Figure 6:
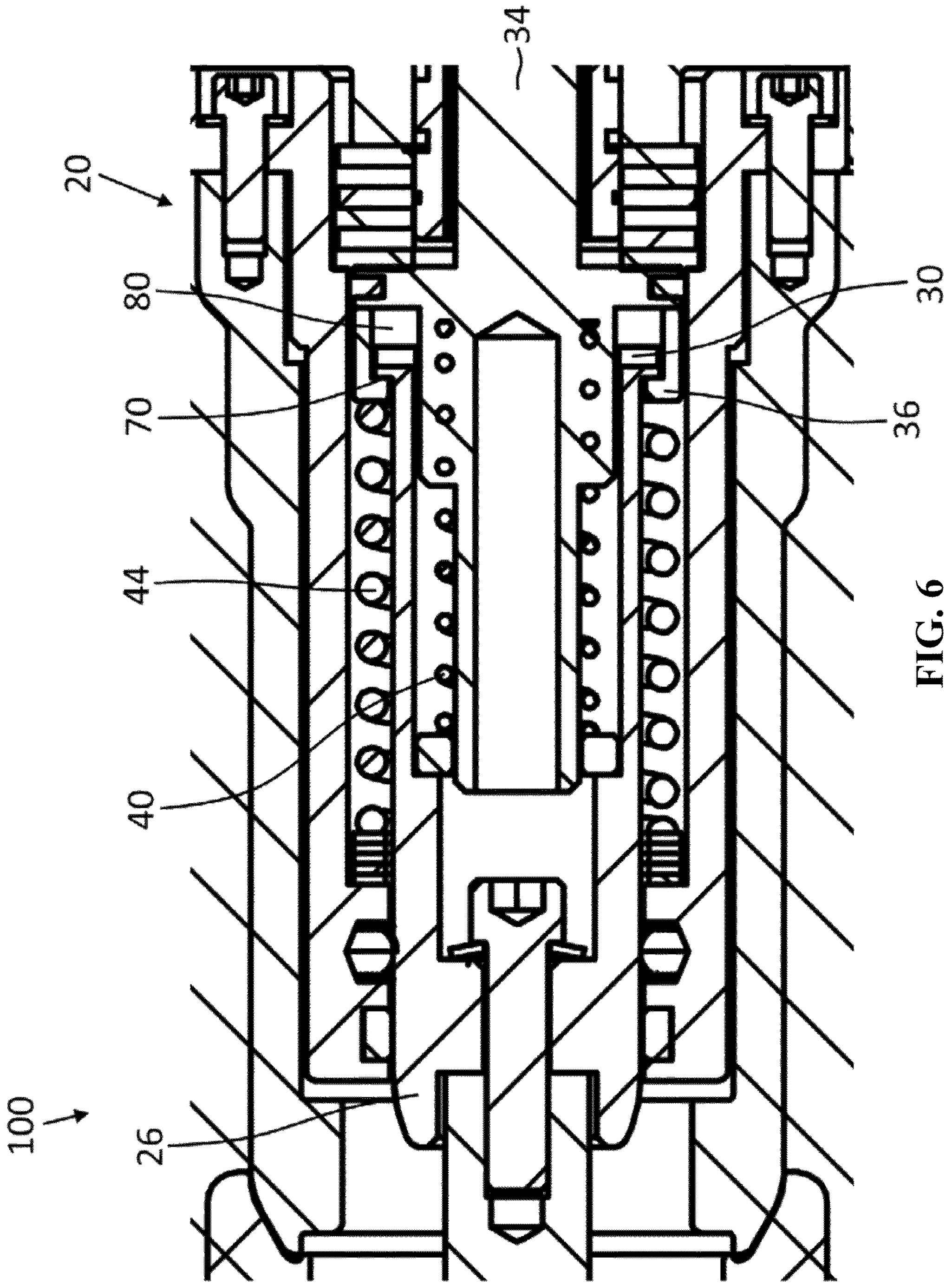
FIG. 6 is a detailed view of a moveable portion of the electric power interrupter of FIG. 5.

Referring now to FIGS. 5 and 6, the electric power interrupter 100 is shown in an open state, with a detailed view of the moving section 20. In the open state shown in FIG. 5, the trusses (64, 66) of the toggle mechanism 50 are upwardly pivoted as the shared pivot point 62 is upwardly offset with the central horizontal axis of the electric power interrupter 100. The toggle mechanism 50 is therefore pulling the plunger 34 towards the right side of the electric power interrupter 100. The butt end of the shaft 24 of the moving section is thus separated from the butt end of the fixed section 10 and the ark is extinguished within the vacuum interrupter 2. Referring now to FIG. 6, the plunger 34 and the associated inwardly extending hook 36 have been pulled to the right side of the electric power interrupter 100 when compared to the same parts in the ready to trip state of FIG. 4. The gap 70 between the inwardly extending hook 36 and the outwardly extending hook 30 is null and therefore both parts are touching one another. The touching, or hooking, of the inwardly extending hook 36 with the outwardly extending hook 30 allows for the plunger 34 to pull the inner tubular section 26, and by association the shaft 24 of the moving section 20, to the right side of the electric power interrupter 100.

When switching from the close state to the open state, a significant amount of force is required to overcome inertia. In the close state, the first spring 40 and the second spring 44 are compressed. The first 40 and second 44 springs apply a right oriented force on the plunger 34. Therefore, once the toggle mechanism 50 starts pulling the plunger 34 towards the right, the first 40 and second 44 springs provide a significant force on the plunger 34 in the same direction to help overcome the inertia of the system. During the initial moments of tripping the electric power interrupter 100, the compressed first spring 40 also pushes to the left against the inner tubular section 26. Accordingly, the shaft 24 of the moving section 20 does not initially move and therefore keeps touching the shaft 14 of the fixed section 10. During the initial moments, only the plunger 34 is moved to the right and the gap 70 between the inwardly extending hook 36 and the outwardly extending hook 30 is reducing the more the plunger 34 is displaced. Once the gap 70 is closed between the inwardly extending hook 36 and the outwardly extending hook 30, which are now abutting against one another, the inner tubular section 26 also moves to the right due to the pull from the inwardly extending hook 36 on the outwardly extending hook 30. With the displacement of the inner tubular section 26, the shaft 24 of the moving section 20 is also displaced to the right and the interrupter 100 opens up. After a given displacement of the plunger 34 and of the inner tubular section 26, the first spring 40 may stop pushing against the plunger 34 to the right and only the second spring 44 may keep pushing the plunger 34 to the right. Understandably, the toggle mechanism 50 may keep pulling the plunger 34 to the right. The first spring 40 may thus become tensed and may start pulling on the plunger 34 against the toggle mechanism 50 and the second spring 44. After yet another given displacement from the plunger 34 to the right, the toggle mechanism 50 may keep pulling the plunger 34 to the right. Understandably, by having springs with various specifications, the force from the springs and the distance of displacement of the plunger 34 until said springs start pulling instead of pushing may be adapted to desired predetermined values.

When switching from the open state to the close state, the gap 70 between the inwardly extending hook 36 and the outwardly extending hook 30 is closed. In such a case, the gap 80 is formed between the outwardly extending hook 30 and the section of the plunger 34 having a larger circumference. When initiating the closing of the electric power interrupter 100, one or both of the first 40 and second 44 springs may pull on the plunger 34 towards the left. The pulling from the first 40 and/or second 44 springs may last until said springs 40 and 44 start getting compressed. During closing of the electric power interrupter 100, the toggle mechanism 50 pushes the plunger 34 to the left. The plunger 34 being pushed to the left, the gap 80 between the larger circumference section of the plunger 34 and the outwardly extending hook 30 is reduced until both parts abut against one another. Understandably, at the same time, the gap 70 between the inwardly extending hook 36 and the outwardly extending hook 30 is also increased. The plunger 34 pushes against the inner tubular section 26 until the shaft 24 of the moving section 20 abuts against the shaft 14 of the fixed section 10 in the vacuum interrupter 2. Even when the fixed 14 and moving 24 shaft ends are touching one another, the toggle mechanism 50 may keep pushing against the plunger 34 towards the left. The plunger 34 may thus further compress the first spring 40 which in turns increases the force applied by the first spring 40 on the inner tubular section 26. Understandably, when the electric power interrupter 100 goes from ready to trip state to closed state, the toggle mechanism 50 may slightly bring the plunger 34 to the right with the moving 24 and fixed 14 shaft ends still in contact.

It may be appreciated that some of the components described above may be manufactured unitarily rather than separately. For example, the shaft 24 of the moving section 20 may be joined to the inner tubular section 26, the circular piece 37 may be joined to the inner tubular section 26 and the inwardly extending hook 36 may be joined to the plunger 34.

Figure 7:
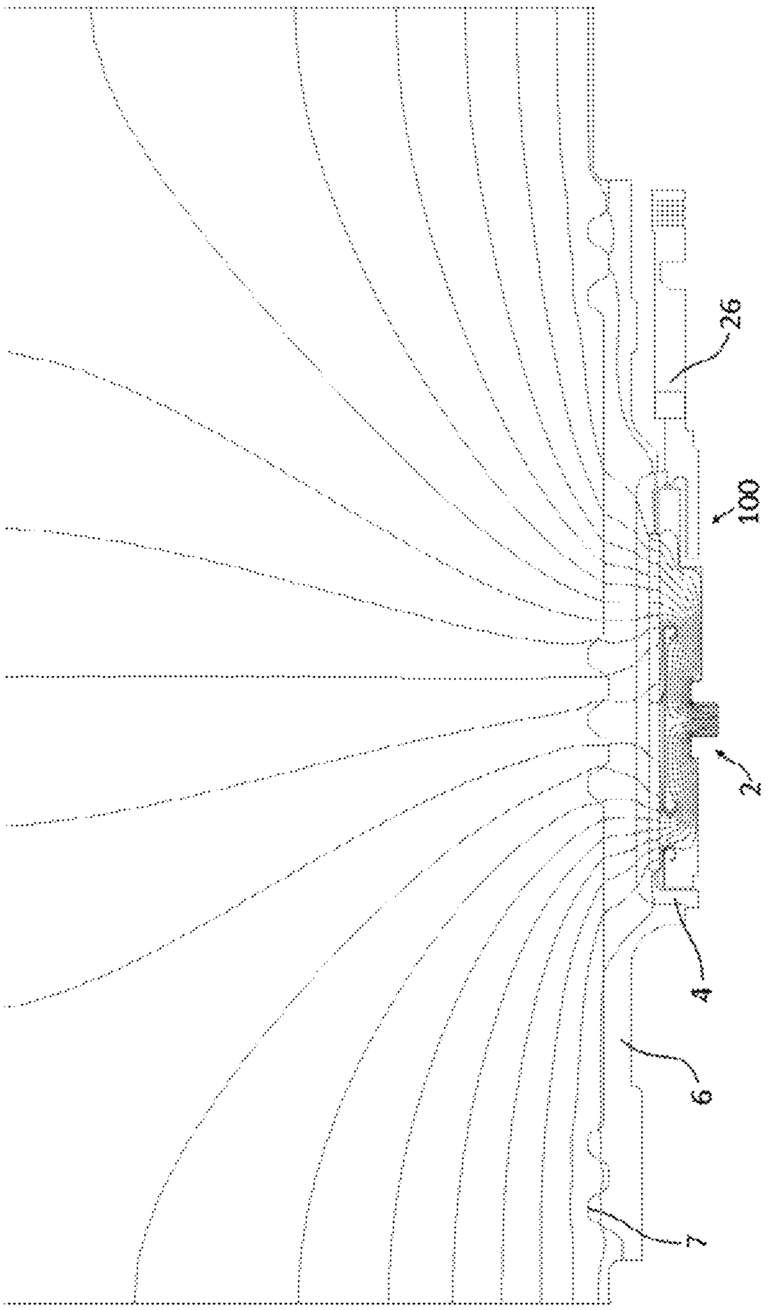
FIG. 7 is a side cross-sectional view of an electric field's strength of an electric power interrupter in accordance with the principles of the present invention.

Referring now to FIG. 7, the combination of epoxy and urethane or silicone around the vacuum interrupter and the fixed and moving sections allows for an optimized voltage distribution around the electric power interrupter. Shown in a darker grey saturation is the higher voltage measurements. The highest values are dispersed throughout the urethane housing and further found in the bottom center of the epoxy insulator and over the fins of the same. Most notably, with this configuration, the highest values of voltage on the surface of the epoxy are all under 1 kV/m which would be considered acceptable for most dielectric tests.

Figure 8:
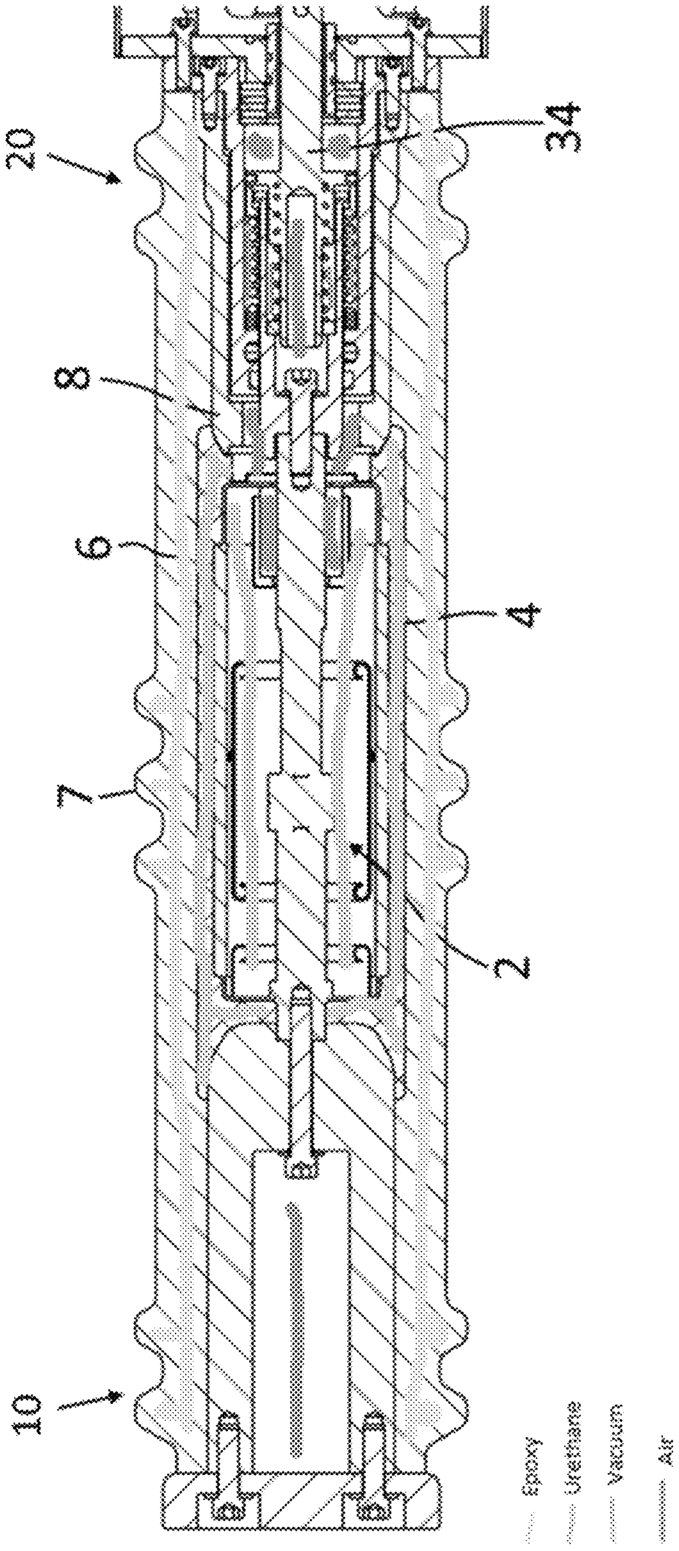
FIG. 8 is a side cross-sectional view of the electric power interrupter of FIG. 3 showing the different materials present on the interrupter and within the interrupter.

Referring now to FIG. 8, in the illustrated embodiment, the yellow color represents the portion of the interrupter 100 comprising epoxy, the cyan color represents the portion of the interrupter 100 comprising urethane, the pink color are portion under vacuum and the orange color represents portions comprising air.

Figure 9:
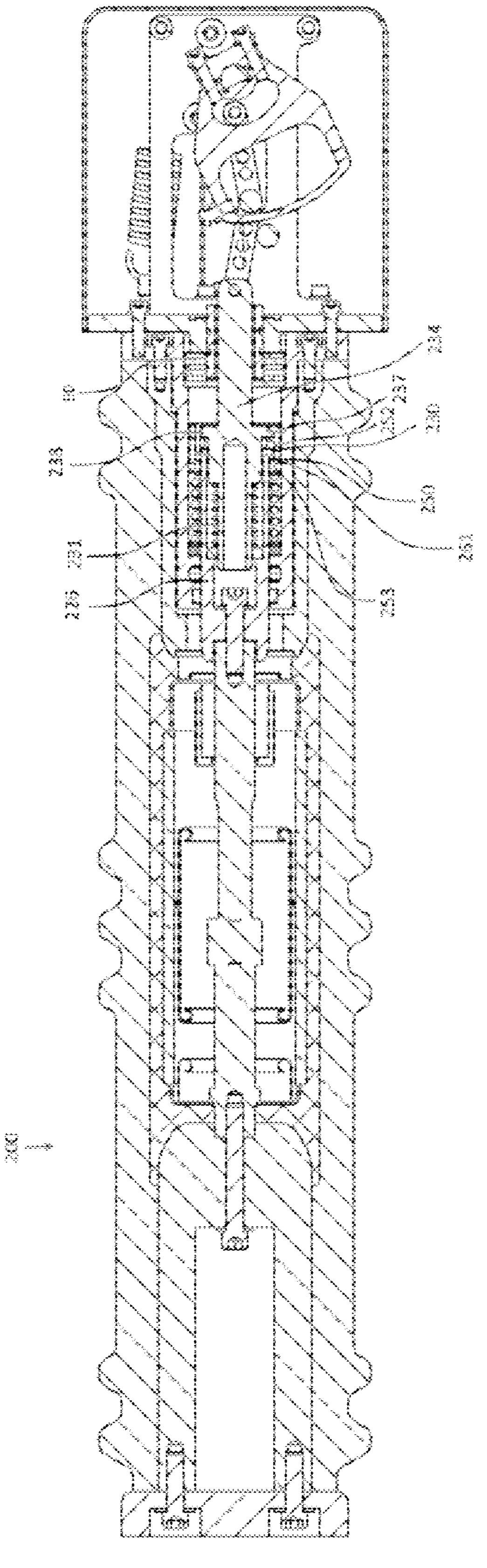
FIG. 9 is a side cross-sectional view of another embodiment of an electric power interrupter in a closed state in accordance with the principles of the present invention.
Figure 10:
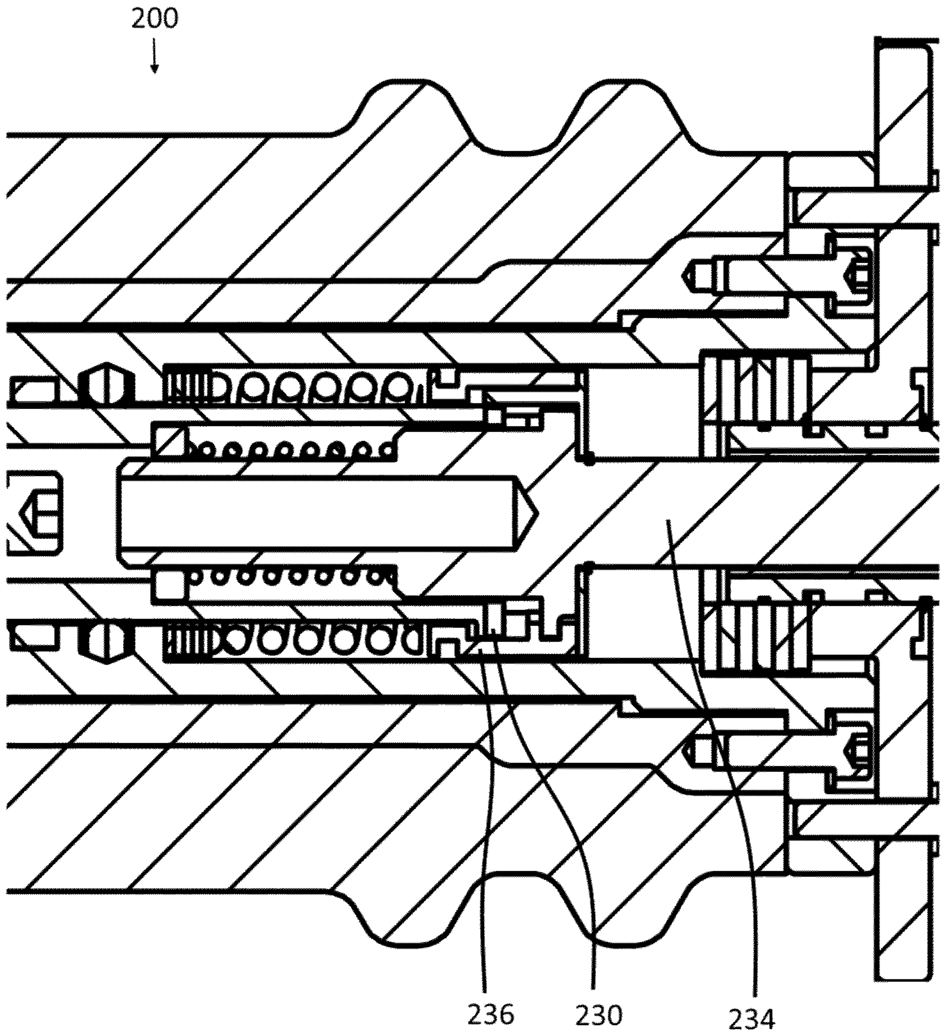
FIG. 10 is a detailed view of a moveable portion of the electric power interrupter of FIG. 9.
Figure 11:
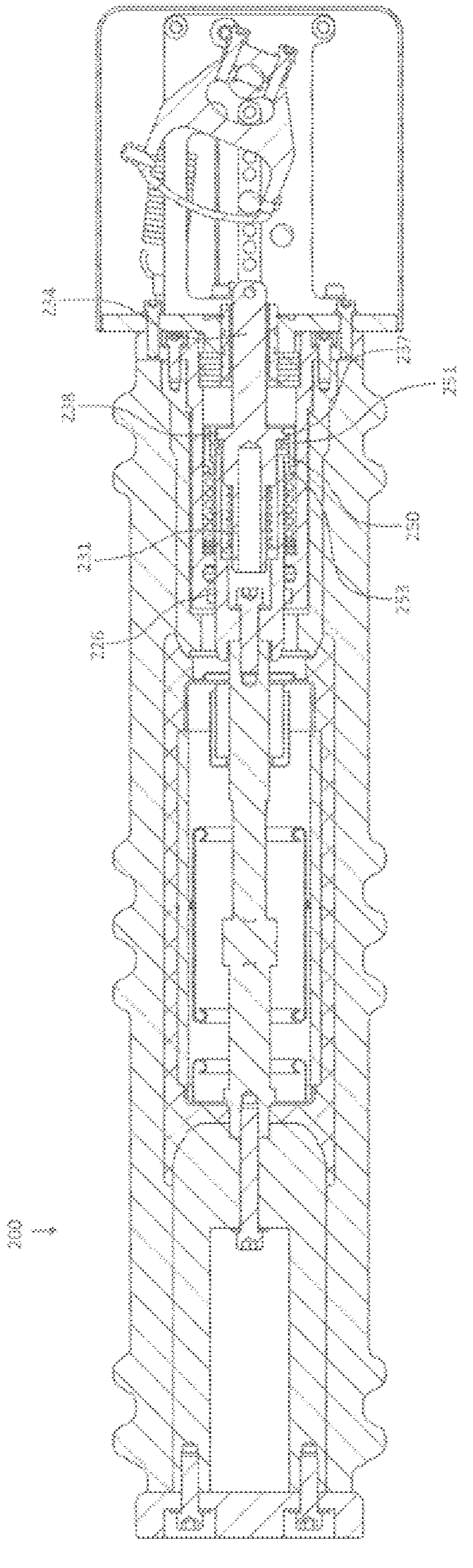
FIG. 11 is a side cross-sectional view of another embodiment of an electric power interrupter in a ready to trip state in accordance with the principles of the present invention.
Figure 12:
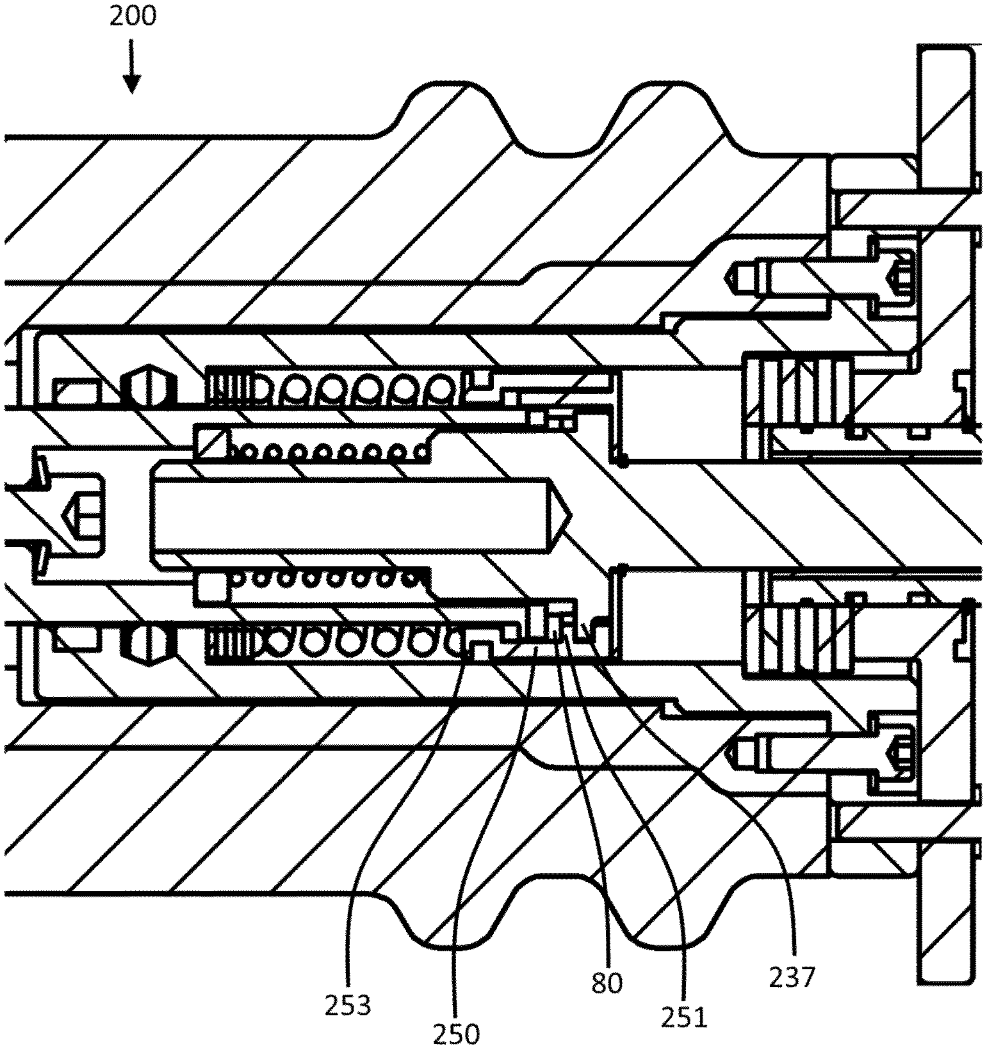
FIG. 12 is a detailed view of a moveable portion of the electric power interrupter of FIG. 11.
Figure 13:
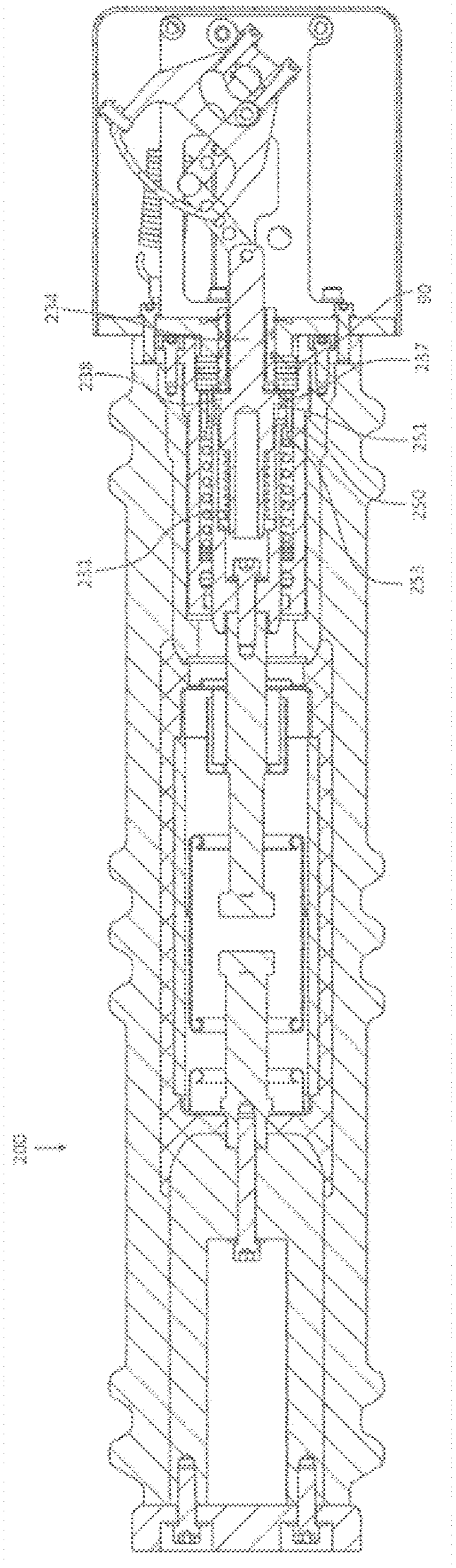
FIG. 13 is a side cross-sectional view of another embodiment of an electric power interrupter in an opened state in accordance with the principles of the present invention.
Figure 14:
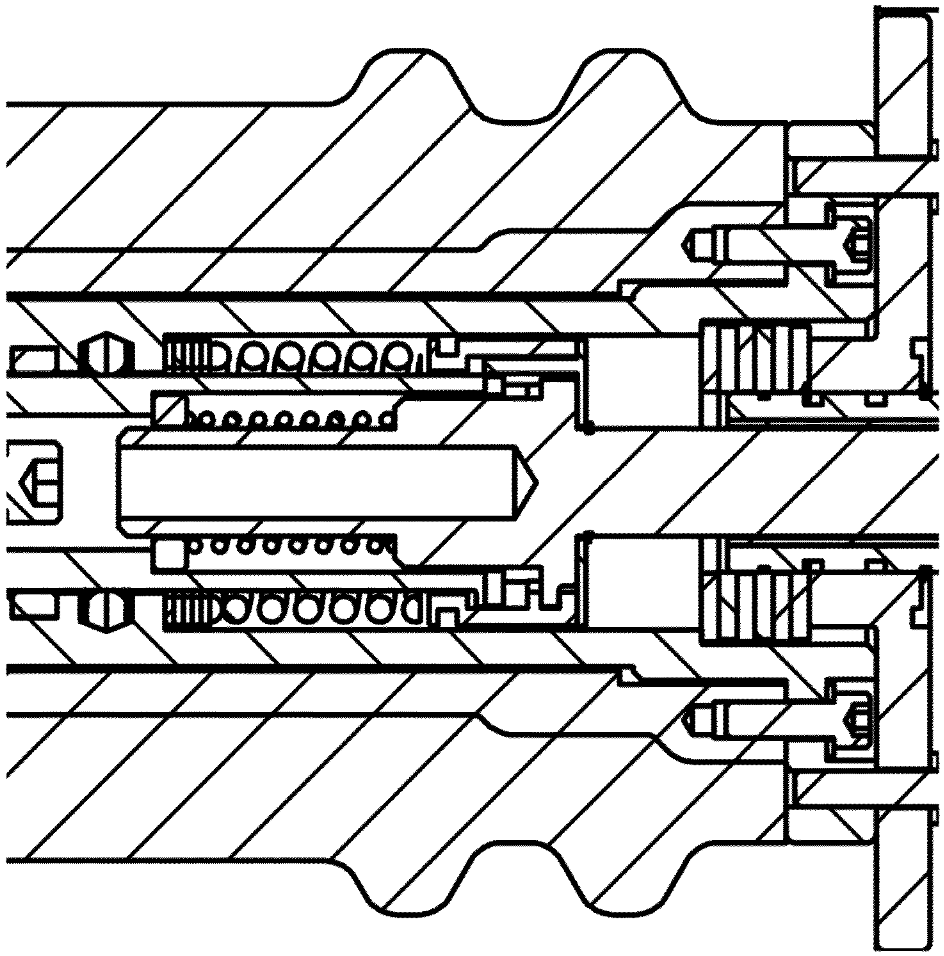
FIG. 14 is a detailed view of a moveable portion of the electric power interrupter of FIG. 13.

Referring now to FIGS. 9 to 14, another embodiment of an electric power interrupter 200 is illustrated. The electric power interrupter 200 comprises similar components to the embodiment of the electric power interrupter 100 as illustrated at FIGS. 1 to 6. The FIGS. 9 and 10 illustrates the fixed portion 10 and the moveable portion 20 in contact when the interrupter 200 is in a closed state. The FIGS. 11 and 12 illustrates the electric power interrupter 200 in a ready-to-trip state where the fixed portion 10 and the moveable portion 20 are in contact. The FIGS. 13 and 14 illustrates the electric power interrupter 200 in open state where the fixed portion 10 and the moveable portion 20 are separated or moved away one from the other. The illustrated interrupter 200 is a vacuum interrupter, however any other type of interrupter known in the art could be used.

Figure 15:
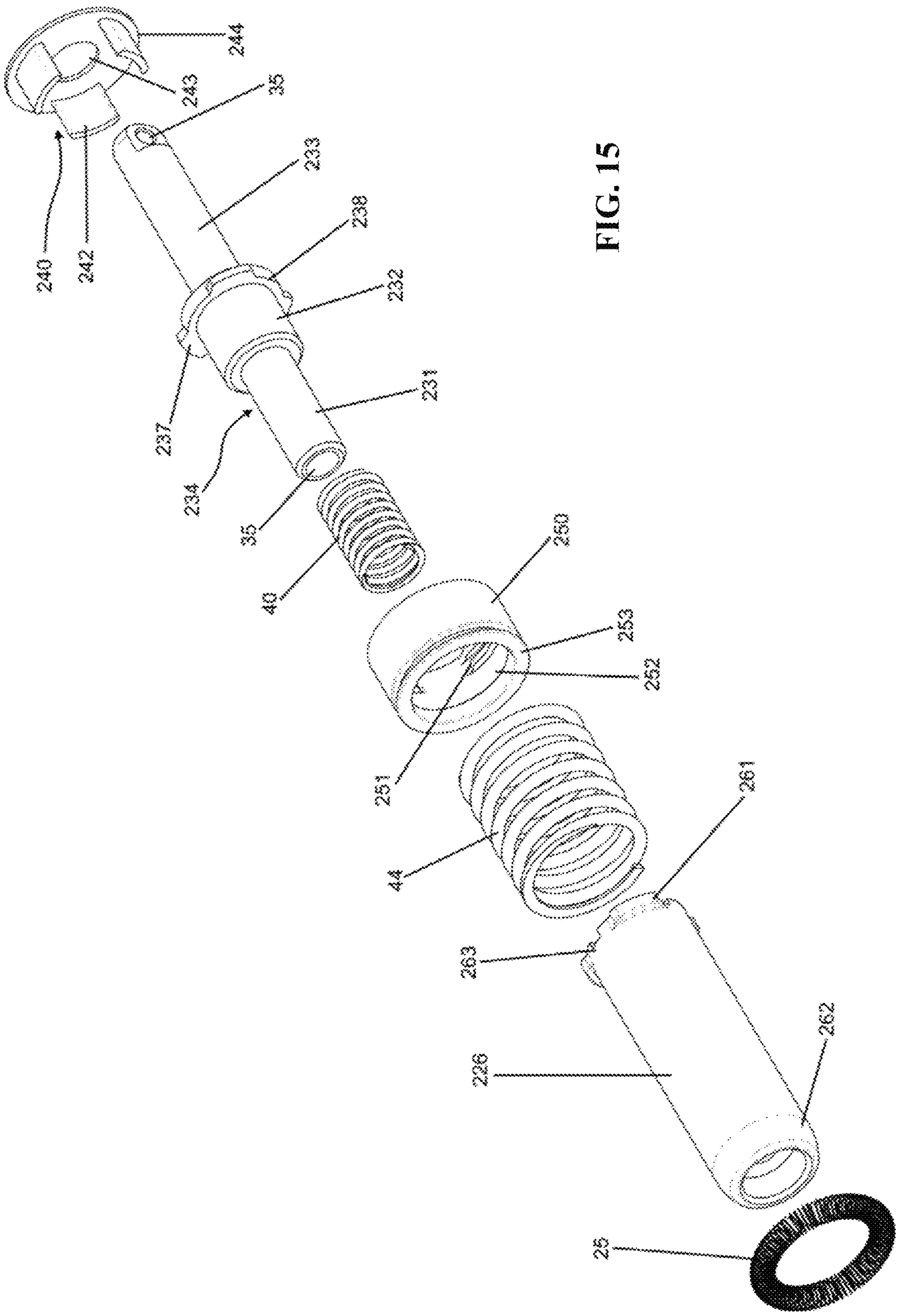
FIG. 15 is an exploded perspective view of the moveable portion of the electric power interrupter of FIG. 9.

Referring now to FIG. 15, in such an embodiment, the movable portion 20 comprises a plunger 234, an annular member 250 adapted to receive an attaching portion 232 of the plunger 234 and an inner tubular section 226. The plunger 234 comprises a first end 231, an attaching portion 232 and a second end 233. The first end 231 is adapted to be partly housed within the inner tubular section 226 and the second end 233 of the plunger 234 is securable to the toggle mechanism 50. In the illustrated embodiment (as shown in FIGS. 9 to 14), the second end 233 of the plunger 234 is pivotally attached to the truss 64. As such, the truss 64 may freely rotate when the toggling mechanism 50 is activated. The attaching portion 232 or cross-section having a larger circumference than the average circumference of the remainder of the body of the plunger 234 is adapted to be received by the annular member 250. In the present embodiment, the annular member 250 comprises an inner surface comprising a receiving member 251, such as a groove, matching the attaching member 232 of the plunger 234. The inner passage of the annular member 250 is generally shaped to receive the largest portion 232 of the plunger 234. In such embodiment, the attachment portion 232 comprises flanges 237 and reduced portion 238. When inserted in the annular portion 250, the plunger 234 is pivoted for the flanges to be locked in placed in the grooves 251. Understandably, any other known means to lock the plunger 234 in the annular member 250 is within the scope of the present invention.

The inner tubular section 226 is also adapted to receive the annular contacting member 25, embodied as an annular spring. The annular contacting member 25 allows a movable contact to permit electrical contact while the inner tubular section 226 moves within the electrical interrupter 200.

The annular member 250 may further comprises a lip 253 and a gap 252 adapted to receive a matching attaching portion 261 of the inner tubular section 226. In the illustrated embodiment, the inner tubular section 226 is inserted by a first end 262 in the annular member 250 and the attaching portion 261 contacts the inner portion 252 of the annular member 250 to allow movement toward the when pushed but to be pulled when tripping. In such embodiment, the outer resilient member 44 is positioned around the inner tubular section 226 in a concentric manner.

The inner resilient member 40 is adapted to surrounds the first end 231 of the plunger 234 which is insertable within the inner tubular section 226. In use, the plunger 234 and surrounding resilient member 40 are inserted in a cavity of the inner tubular section 226 and the plunger is locked to the annular member 250. The first end 231 of the plunger 234 is adapted to pushed on the inner tubular section 226 to which is attached a contact.

As illustrated in FIGS. 9 to 14, an air gap 70 is formed between attaching portion 261 of the inner tubular section 226 and the inner portion 252 of the annular member 250. Another air gap 80 is formed between attaching portion 261 of the inner tubular section 226 and the groove 251 of the annular member 250. As described above, such gap are adapted to allow length adjustments when opening or closing the electric power interrupter 200.

The moving portion 20 may further comprise a locking assembly 240. The locking assembly 240 generally aims at locking any movable components in place to prevent any rotational movement of said components. As such, the locking assembly 240 may comprise a plate 244 comprising an aperture 243 and protruding members 242. The protruding members 242 are generally shapes to be received by lower portions 263 and 238 of the inner tubular section 226 and of the attaching section 232, respectively. The aperture 243 is generally shaped to receive the second end 233 of the plunger 234 and the plate 244 to contact an outer surface of the attaching section 232 of the plunger 234. When in place, the protruding members 242 of the locking assembly 240 contact the flanges 261 and 237 of the inner tubular section 226 and of the attaching section 232, respectively. As such, the protruding members 252 may be shaped as arcuate plates. Understandably, any other known locking assembly 240 preventing any rotational movement of the plunger and of the inner tubular section 226 may be used within the scope of the present invention.

The electric power interrupter 100 or 200 may further comprises a stopping assembly 90 adapted to stop outer movement of the plunger 34, 234. The stopping assembly 90 is generally made of resilient material, aiming at stopping the course of the plunger 34, 234 while absorbing energy of said plunger 234. Such absorption of energy generally aims at avoiding rebounds of the plunger 34, 234 when stopped. The stopping assembly 90 may comprise different layers and may be made of alternates layers of aluminum and urethane.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A high voltage electrical power interrupter, the interrupter comprising:
- an electrically insulated interrupting chamber;
- a first contacting member fixed within the interrupting chamber;
- a toggle mechanism;
- a movable contacting assembly moveable within the interrupting chamber comprising:
  - a second contacting member being elongated;
  - a recess portion; and
  - a first abutting member;
- a plunger movable within the recess portion, the plunger comprising:
  - a first end attached to the toggle mechanism;
  - a second end adapted to resiliently abut on the recess portion; and
  - a second abutting member contactable with the first abutting member;
- wherein a gap is formed between the first and the second abutting members when the power interrupter is closed.

2. The power interrupter of claim 1, the toggle mechanism comprising:
- a resilient member;
- a lever attached to the resilient member;
- a first truss pivotally attached to the lever;
- a second truss pivotally attached to the first truss and pivotally attached to the first end of the plunger;
- wherein the lever induces movement of the first and second trusses to displace the plunger.

3. The power interrupter of claim 1 further comprising a first resilient member partially compressed between the recess portion and the second end of the plunger.

4. The power interrupter of claim 3 further comprising a second resilient member between a portion of the movable contacting assembly and the second abutting member of the plunger.

5. The power interrupter of claim 4, the second abutting member comprising a hook adapted to push against the first abutting member.

6. The power interrupter of claim 5, the first abutting member comprising a hook operatively matching with the hook of the second abutting member.

7. The power interrupter of claim 4, the second resilient member having a resilient force being equal or higher than the first resilient member.

8. The power interrupter of claim 7, the first and second resilient members being concentrical springs.

9. The power interrupter of claim 4 wherein the second resilient member surrounds inserted the first resilient member.

10. The power interrupter of claim 3 wherein the first resilient member is at least partially compressed when the power interrupter is closed.

11. The power interrupter of claim 1, the gap being annular around the elongated contacting assembly.

12. The power interrupter of claim 1 further comprising an insulating housing, the housing comprising a vacuum chamber.

13. The power interrupter of claim 12, wherein the housing is made of any one of or a combination of urethane, polymer and silicone.

14. The power interrupter of claim 1, wherein when the power interrupter is open the toggle mechanism is configured to move the abutting member of the plunger toward the abutting member of the contact to engage the abutting member of the plunger with the abutting member of the contact.

15. The power interrupter of claim 1, the abutting member of the plunger being a hook.

16. The power interrupter of claim 15, the abutting member of the recess portion being a hook matching the shape of the hook of the plunger.

17. A method for interrupting high voltage electrical power, the method comprising:

upon tripping, resiliently moving a first abutting member of a plunger within a gap between the first abutting member of the plunger and a second abutting member of a movable contacting assembly;

when the gap is closed, engaging the first and second abutting members; and pulling the movable contacting assembly away from a fixed contacting assembly.

18. The method of claim 17 further comprising decompressing a first partially compressed resilient member between the plunger and the movable contacting assembly and decompressing a second resilient member between the movable contacting assembly and the first abutting member upon tripping.

19. A method for closing a high voltage power interrupter, the method comprising:

slidably pushing a plunger toward an interrupting chamber;

the plunger resiliently pushing a first contacting member of a movable contacting assembly toward a second fixed contacting member;

the pushed plunger creating a gap between a first abutting member of the plunger and a second abutting member of the movable contacting assembly;

maintaining contact between the first contacting member and the second fixed contacting member.

20. The method of claim 19, the contact between the first and second contacting members being maintained by toggling a latch mechanism.

* * * * *